P. P. EMORY.
Discharge-Valve for Paper-Pulp Engines.
No. 213,640. Patented Mar. 25, 1879.
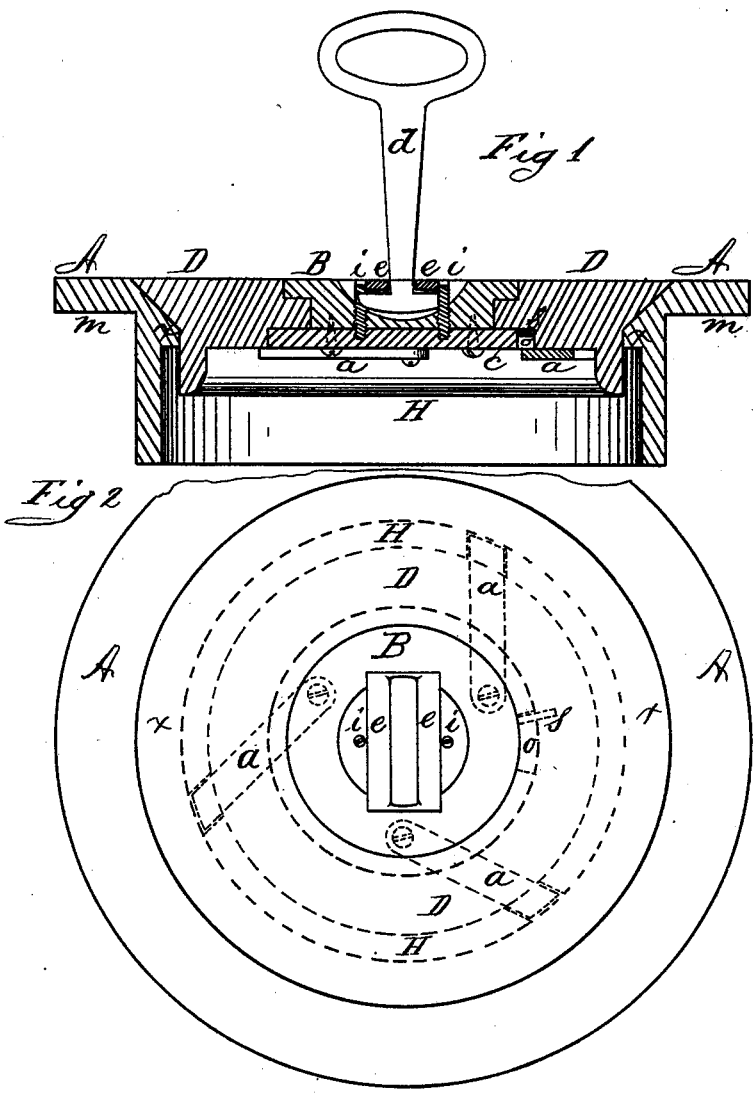

UNITED STATES PATENT OFFICE.

PASCHAL P. EMORY, OF SPRINGFIELD, MASSACHUSETTS.

IMPROVEMENT IN DISCHARGE-VALVES FOR PAPER-PULP ENGINES.

Specification forming part of Letters Patent No. 213,640, dated March 25, 1879; application filed January 27, 1879.

*To all whom it may concern:*

Be it known that I, PASCHAL P. EMORY, of Springfield, county of Hampden, and State of Massachusetts, have invented new and useful Improvements in Discharge-Valves for Pulp-Grinding Engines, which improvements are fully set forth in the annexed specification and in the accompanying drawings.

The object of my invention is to provide a pulp-discharge valve which can be conveniently and securely locked in its place in the bottom of a pulp-grinding tub, so that it cannot be lifted from its seat by pressure from beneath it; and it consists in constructing the central portion of the valve proper separate from the valve, of a disk form, and arranged to have a reciprocating rotary motion within the valve, said reciprocating motion serving to project a series of arms or locking-bars under a rim inside the valve-seat ring to lock the valve, and in a peculiar construction of key bars and pins for operating said locking-bars.

Referring to the drawings, which consist of two figures, Figure 1 is a cross-section, and Fig. 2 is a plan view, of my valve.

In the drawings, A is the valve-seat ring. B is the locking-bar disk. *a a a* are three locking-bars. D is the valve. *c* is a flange secured on the under side of disk B. *e e* are key-bars in disk B, and *i i* are key-pins in the same piece. *d* is the valve-key. *o* is a stop-notch in the edge of flange *c*, and *s* is a stop-pin in valve D.

The valve-seat ring A is of the ordinary construction, with the addition of the rim *x* below the seat, under which bars *a* project to lock the valve. Valve D is constructed to fit the seat in ring A, as usual, but is drilled through its center to provide for the insertion therein of disk B flush with the surface of said valve. On the under side of disk B is secured a flange, *c*, its edge projecting sufficiently over a counterbored border around it in valve D, to retain disk B securely in the valve, but allowing of turning it freely in the valve. In the periphery of flange *c* is cut a notch, *o*, and opposite it in valve D is set a pin, *s*. Valve D is constructed with a downwardly-projecting rim, H, which is perforated at points where locking-bars *a* pass through it. Upon the under side of flange *c* are pivoted three locking-bars, *a a a*, as shown, their outer ends passing through perforations in said rim H.

Across a concavity in the upper face of disk B are fixed two parallel bars, *e e*, and by the sides of the said bars are set, vertically, in said disk two pins, *i i*.

Key *d* is made, as shown, with its bottom portion of an inverted T shape.

My valve is secured to the bottom of an engine-tub in the usual manner by bolts through the flange *m* around the border of ring A; and my valve is operated as follows, viz: When valve D is set into its seat-ring A to close the conduit it covers, the locking-bars *a* are in the position shown by the dotted lines representing said bars in Fig. 2. Key *d* is now inserted between bars *e* in disk B, and turned partially around until its arms encounter pins *i i*, as shown in Fig. 1, when, by continuing to turn the key, disk B is rotated in valve D, causing locking-bars *a a a* to be pushed longitudinally through the perforations in which they slide in rim H to valve D, out under the rim *x* in ring A, thus locking valve B securely, so that it cannot be lifted off from its seat by pressure upwardly in the conduit to which the valve is secured.

To open and remove the valve, the key is inserted and turned in the opposite direction, withdrawing bars *a* to the position shown in Fig. 2.

Ordinarily valves for the above-named use are constructed with one bar across the concavity in the top, for they are removed by being simply lifted with a hook. It is obvious that an attempt to so open my valve might result in breaking the ends of bars *a*, or bending them so as to temporarily disable the valve. Therefore I fix across said concavity in my valve two bars, *e e*, and by their sides the two pins *i i*, so that such a hook as is ordinarily used to open common valves cannot be inserted in under the bars *e* in mine, but compelling the use of a special key, which requires to be turned to make it hook on, and in turning which the valve itself is unlocked and can be lifted out.

Pin *s* is fixed in valve D with one end projecting into the notch *o* cut in the periphery of flange c, to act as a stop to prevent any rotation of disk B in excess of that required to produce the requisite movement of the bars a to lock or unlock the valve, the rotary course of the disk being determined by the length of notch o.

What I claim as my invention is—

1. The valve D, constructed with the reciprocally-rotating disk B therein, in combination with the locking-bars a, and arranged to operate substantially as and for the purpose set forth.

2. The combination of the valve-seat ring A, constructed with the rim x around its interior, locking-bars a, disk B, and valve D, substantially as set forth.

3. The disk B, constructed with a cavity in its outer face, as shown, and having the key-bars e e fixed across said cavity, and the key-pins i i fixed in said disk vertically by the sides of said key-bars, substantially as and for the purpose set forth.

PASCHAL P. EMORY.

In presence of—
H. A. CHAPIN,
WM. H. CHAPIN.